Patented Aug. 18, 1942

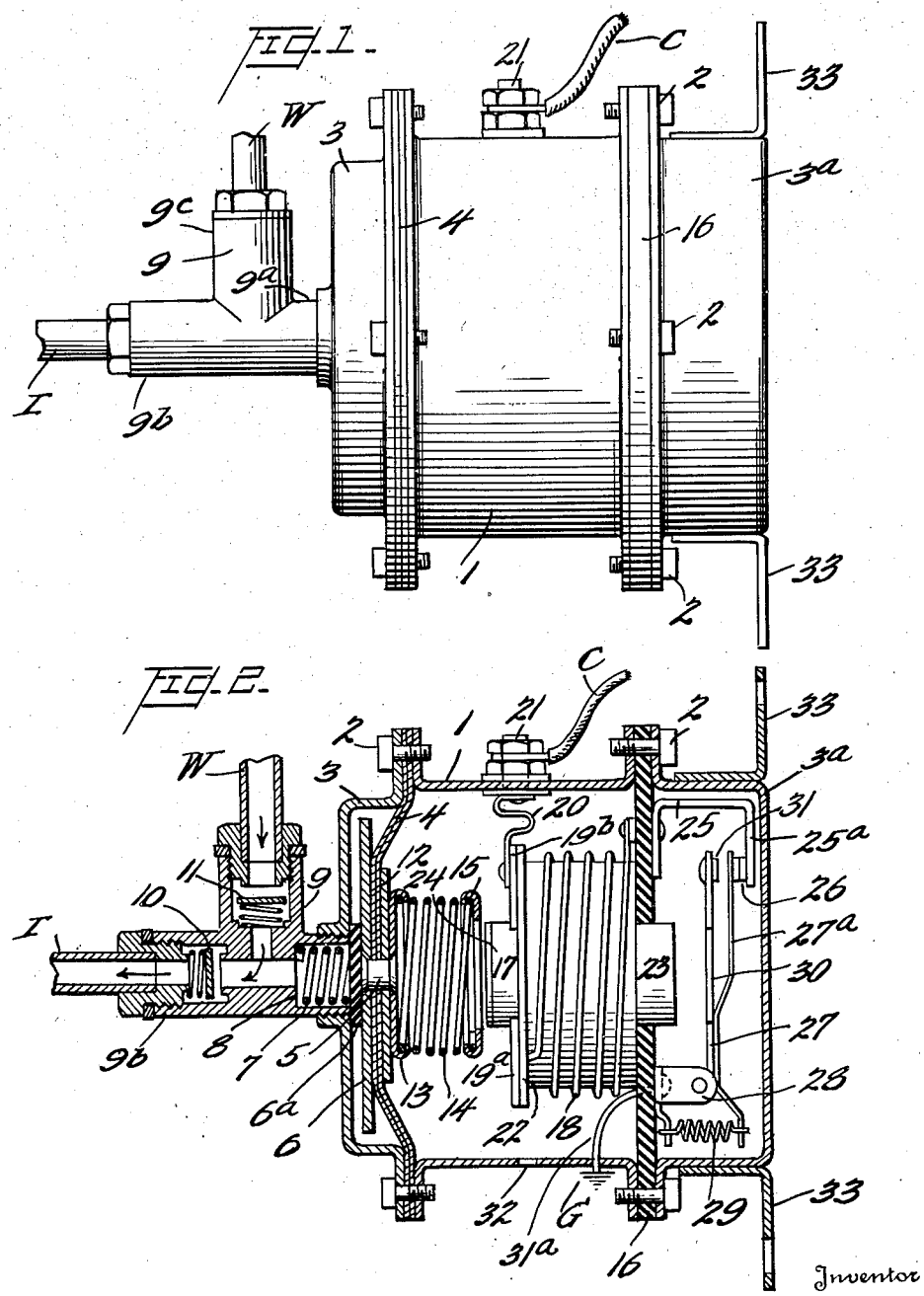

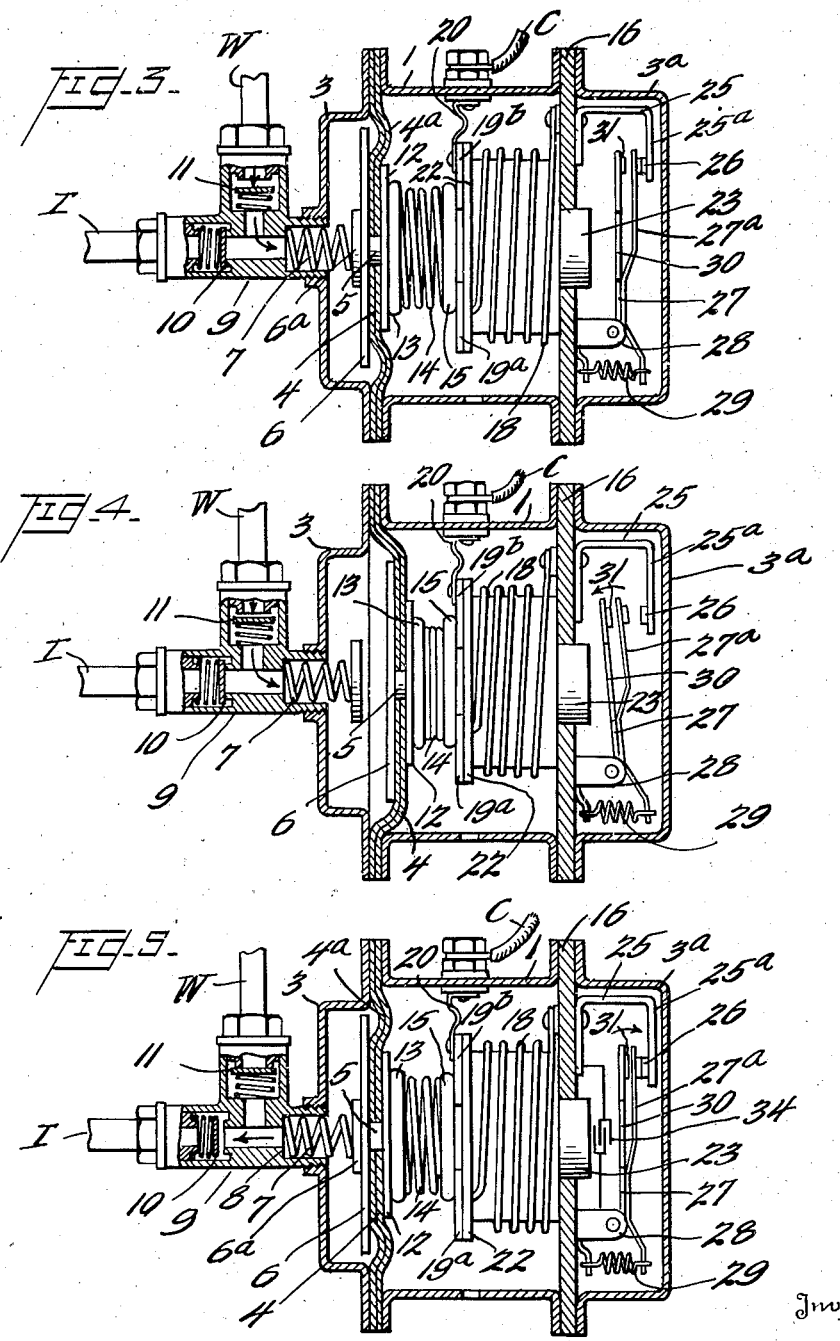

2,293,542

UNITED STATES PATENT OFFICE 2,293,542

BOOSTER FOR WINDSHIELD WIPERS

Ralph G. Hamilton, Staunton, Ill.

Application April 2, 1941, Serial No. 386,564

6 Claims. (Cl. 230—170)

This invention relates to windshield wipers of the so-called "vacuum type," and has for its object to improve the operation of such type of wipers.

Windshield wipers now in common use upon automobiles are operated by the suction produced in the intake manifold of the automobile engine. However, such wipers are subject to the disadvantage that when the engine is under load, as when the automobile is climbing a steep hill, or when the throttle of the engine is wide open, the suction in the intake manifold drops and consequently the action of the windshield wiper slows down or stops altogether.

An important object of my invention is to provide an improved form of booster for windshield wipers which automatically is brought into play to drive the wiper when the suction in the manifold falls below a predetermined limit, so as to maintain the wiper in continuous and uniform operation regardless of the performance of the engine. More particularly this object is accomplished by providing electromagnetic means for driving the booster, and a control switch for cutting the booster into and out of operation, the control switch being automatically operable by means responsive to the suction in the manifold which governs the operation of the wiper.

Another object of my invention is to provide a booster of the above character which can be readily assembled with various types of suction-operated windshield wipers now in common use, and which, therefore, can be sold as accessory equipment for employment with such wipers.

Still another object of my invention is to provide a booster of the above character which is simple in construction, reliable in operation, and economical to manufacture and operate.

Other objects and advantages of the invention will be apparent from the following detailed description of a preferred embodiment of my invention, reference being had to the annexed drawings, in which:

Figure 1 illustrates in side elevation a booster designed for use with windshield wipers of the vacuum type;

Figure 2 is a longitudinal cross-sectional view through the booster of Fig. 1, showing the position of the parts when the windshield wiper is operating normally;

Figure 3 is a cross-sectional view corresponding to Fig. 2, but showing one position assumed by parts of the booster when the suction produced by the intake manifold fails;

Figure 4 is a cross-sectional view corresponding to Fig. 2 showing the position of the parts when the electromagnet is energized; and Figure 5 is a view corresponding to Fig. 2, showing the position of the parts upon de-energization of the electromagnet.

In the drawings is illustrated a booster adapted for use with windshield wipers of the type designed to be operated from the intake manifold of an automobile motor. In the booster shown, 1 designates the main housing composed of metal, which is cylindrical in form and provided with circumferential flanges at its ends. These flanges are tapped to receive screws 2 by which front and rear covers 3 and 3a, respectively, are secured to the ends of the housing to close the latter. Clamped between the front cover 3 and main housing is a diaphragm 4 made of treated flexible material, such as laminated silk or Neoprene, this diaphragm being compressed on assembly to form an annular channel 4a to facilitate the lateral flexing of the diaphragm.

Secured to the forward face of the diaphragm by means of a rivet 5 is a reinforcing plate 6. A coil spring 7 exerts pressure axially of the housing against the reinforcing plate. This spring is provided at one end with a rubber insulating and silencing disk 6a adapted to bear against the reinforcing plate and at its other end passes through a centrally-disposed opening in the front cover 3 and fits within a pocket 8 formed in one end of a branch 9a of a T-coupling 9. The branch 9a of this T-coupling is threadedly connected to the opening provided in the front cover 3, while a branch 9b in line with branch 9a is adapted to be coupled to a hose I forming part of a windshield wiper operating line leading from the intake manifold. The third branch 9c of the T-coupling, communicating at right angles with the branches 9a and 9b just mentioned, is connected to a hose W forming part of the line leading to a vacuum-type windshield wiper.

A spring-pressed check valve 10 is interposed in the branch 9b, and a similar spring-pressed check valve 11 is located in the branch 9c of coupling 9. The check valve 10 is so constructed and arranged as to remain open in response to a predetermined amount of suction in the manifold and to close and break communication between the manifold line and the coupling when the suction falls below the value required to overcome the spring pressure on the valve. The check valve 11 in branch 9c operates similarly to maintain this branch open while the suction in the manifold is great enough to overcome its spring pressure, but to close communication between the branch 9c and the windshield wiper line when the suction falls off.

An armature disk 12 is fastened to the rear face of the diaphragm by means of the rivet 5, and overlying this armature and also secured thereto by the rivet 5 is a spring cap 13 having an inturned marginal flange by which one end of a coil spring 14 is anchored to the cap. The coil spring extends centrally of the housing and has its other end similarly fastened to a ring shape switch plate 15, constituting a control switch.

Interposed between the end of the housing 1 and the rear cover 3a is a partition 16, composed of fiber or other electrically insulating material, and serving as a mount for an electromagnet 17 disposed centrally of the housing. A wire 18 is wound about the electromagnet in such manner that when a current passes through the wire the electromagnet is energized, the right-hand end of the magnet becoming the S-pole and the left-hand end becoming the N-pole. This electromagnet is of from six to eight volt capacity with its winding such as to induce strong magnetization with low amperage draw. An end of the wire 18 is connected to one contact 19a of a double contact plate 19, the other contact 19b of the contact plate being connected by a conductor 20 to a binding post 21 mounted exteriorly of the housing and suitably insulated therefrom. The post 21 is connected by a cable C to a source of current. The contact plate is supported upon the end of the electromagnet 17 nearest and in a plane parallel to the switch plate 15, being insulated from the electromagnet by a fibre ring 22. The electromagnet has a soft iron core 23, its N-pole end, opposed to the diaphragm, being capped by a rubber cushion 24.

The end of the electromagnet winding opposite that which is connected to the contact plate 19 extends through the partition 16, and is connected to a metal post 25 mounted upon the partition. The post is curved so as to provide an overhang 25a on the under side of which is secured a contact button 26. Arranged to swing toward and from this contact button is a circuit interrupter comprising a breaker arm 27 extending across the S-pole of the electromagnet and pivoted upon a metal bracket 28 fastened to the partition 16.

To the breaker arm 27 is secured a spring metal circuit-closing arm 27a bent at one end so as to lie intermediate the breaker arm and contact button 26, and at its other end projecting beyond the breaker arm to afford an anchorage for one end of a tension spring 29. The other end of this tension spring is anchored to the foot of the bracket 28, so that the spring exerts a pull in a direction tending to rock the breaker arm about its pivotal mounting upon bracket 28 and causing the circuit-closing arm 27a to engage the contact button 26. An armature disk 30 supported on the breaker arm 27 is adapted to be attracted by the electromagnet 17 when the latter is energized to swing the breaker arm in the reverse direction, breaking engagement of the circuit-closing arm with contact button 26. A rubber cushion 31 on the breaker arm and spaced from the circuit-closing arm serves to silence the operation of the circuit interrupter when in operation.

The bracket 28 is in circuit with a conductor 31a extending through the partition 16 and connected to the metal housing 1, the housing being grounded as indicated at G. A vent 32 is formed through the wall of the housing between the diaphragm and partition 16 for admitting atmospheric pressure to the housing. Angle members 33 are secured to the rear cover 3a for mounting the booster.

The operation of the booster just described is as follows: The booster is preferably installed under the hood and supported on the dashboard by means of the angle members 33. The hose line extending between the intake manifold and the windshield wiper is cut and the opposed ends of the resulting two hose sections are connected to the T-coupling, the end of the hose section I leading from the intake manifold being connected to the branch 9b of the coupling and the end of the hose section W leading to the windshield wiper being connected to the branch 9c of this coupling. This places the booster in series with the vacuum line which furnishes suction for operating the windshield wiper. The post 21 is connected to the generator terminal of the voltage regulator of the automobile engine, or, if the car does not have a voltage regulator, to the terminal of the generator.

When the engine is running and the windshield wiper is operating normally, the suction in the intake manifold produces a current of air through the branches of the T-coupling 9 as indicated by the arrows in Fig. 2. The suction is sufficient to draw the diaphragm 4 forwardly against the action of coil spring 7, together with the switch plate 15 supported on coil spring 14 so that the switch plate is maintained out of engagement with contact plate 19, and the energizing circuit for the electromagnet 17 is open. This also will be substantially the position of the parts when the wiper is turned off with the engine running, for the reason that sufficient suction will be produced in the intake manifold to hold the diaphragm in a forwardly position, the branch 9c of T-coupling 9 under such circumstances being closed to atmospheric pressure.

When the suction in the intake manifold drops so low as to permit the closing of check valve 10 of the T-coupling under the urge of its spring, atmospheric pressure opens check valve 11, and this pressure in conjunction with coil spring 7 acting upon diaphragm 4 moves the diaphragm to the position shown in Fig. 3, thus causing the switch plate to bridge the contacts 19a and 19b of contact plate 19. The electromagnet is thus energized by completing the following circuit: Current from the generator passes through cable C to binding post 21; then through conductor 20 to contact 19b; thence through switch plate 15 to contact 19a; thence through the electromagnet winding 18 to post 25; and thence through circuit-closing arm 27a, to the metal bracket 28 from which the current is led by conductor 31a to the main housing 1 which, in turn, is grounded to the frame of the vehicle.

Energization of the electromagnet causes the armature disk 12 to be attracted toward the N-pole of the electromagnet, which action flexes the diaphragm into the position shown in Fig. 4, compressing the coil spring 14 intermediate the diaphragm and the switch plate, which latter continues to bridge the contacts 19a and 19b. Inward movement of the diaphragm produces suction, causing air to be drawn into the housing through the check valve 11 and serving to operate the windshield wiper.

As soon as the electromagnet is energized, the armature disk 30 on breaker arm 27 is drawn toward the S-pole of the electromagnet (as indicated by the arrow in Fig. 4) breaking contact between circuit-closing arm 27a and contact button 26 on post 25. This causes the diaphragm, under the thrust of compressed coil spring 14, to be restored to the position indicated in Fig. 5, the air within the housing forwardly of the diaphragm being expelled through the valve 10 into the intake manifold line. At the same time, the tension spring 29 connected to the end of circuit-closing arm 27a pulls the breaker arm 27 in a direction such as to reestablish contact between the circuit-closing arm and post 25 and again close the circuit.

Opening and closing of the circuit by the interrupter occurs many times a second, the diaphragm alternately being moved inwardly and outwardly with a pumping action, as just described, to induce a flow of air from the windshield wiper through the valve 11, and thence through valve 10. This produces the suction required to maintain the windshield wiper in operation as long as the suction in the intake manifold is insufficient for this purpose. As soon as the suction in the intake manifold becomes great enough to drive the wiper in a satisfactory manner, the check valve 10 opens against the pressure of its spring to place the intake manifold in driving circuit with the wiper, the suction of the intake manifold drawing the diaphragm forwardly into the position shown in Fig. 2 and breaking contact of switch plate 15 and contact plate 19. This cuts the booster out of operation for as long a time as the suction of the engine is strong enough to keep the wiper in active operation.

When the engine is not running no current is supplied by the generator and consequently the booster remains idle, notwithstanding the electromagnet circuit is closed.

As indicated in Fig. 5, a shunt including a condenser 34 may extend across the interrupter if this should be found to be necessary or desirable.

It will be apparent that the booster just described is applicable to windshield wipers employed on motor cars, busses, trucks, motor boats and other motor vehicles, and serves to maintain the wiper in constant and uniform operation regardless of a drop in suction in the intake manifold resulting from quick acceleration, wide open throttle or heavy loads upon the engine. Furthermore, since the booster draws current only during the period it takes over the wiper driving operation, current consumption is negligible. Because the booster has comparatively few moving parts, it will not readily get out of order, and because of its simplicity it is capable of economical manufacture.

Manifestly the invention is capable of embodiment in forms other than the preferred form described above and which is to be regarded as exemplary rather than as restrictive of the invention.

I claim:

1. A booster for windshield wipers of the type adapted to be operated by the suction produced in a line connected to the intake manifold of an engine, said booster comprising a housing, a movable diaphragm within said housing, the housing upon one side of the diaphragm being open to atmospheric pressure and upon its other side being connected to the wiper-operating line, an electromagnet, a field circuit adapted to be connected to a source of current for energizing said electromagnet, an armature associated with the diaphragm and located within the influence of the electromagnet, check valves so constructed and arranged as to allow one-way flow of air from the wiper to the housing and from the housing to the intake manifold, an interrupter operated from said circuit for automatically making and breaking said circuit, and a switch plate resiliently supported by said diaphragm for closing said circuit in one position of the diaphragm and for opening said circuit in another position of the diaphragm.

2. A booster for windshield wipers of the type adapted to be operated by the suction produced in a line connected to the intake manifold of an engine, said booster comprising a housing, a movable diaphragm within said housing, the housing upon one side of the diaphragm being open to atmospheric pressure and upon its other side being connected to the wiper-operating line, an electromagnet, a field circuit adapted to be connected to a source of current for energizing said electromagnet, an armature associated with the diaphragm and located within the influence of the electromagnet, check valves so constructed and arranged as to allow one-way flow of air from the wiper to the housing and from the housing to the intake manifold, an interrupter operated from said circuit for automatically making and breaking said circuit, said interrupter comprising a switch member, an armature associated with said member adapted to be attracted by the electromagnet for moving said switch member to circuit-opening position when the electromagnet is energized and additional means for moving said switch member to circuit-closing position when said electromagnet is de-energized, and a switch plate associated with the diaphragm for closing said circuit in the position assumed by the diaphragm when the air pressure is approximately equal upon opposite sides of the diaphragm.

3. A booster for windshield wipers of the type adapted to be operated by the suction produced in a line connected to the intake manifold of an engine, said booster comprising a housing, a movable diaphragm within said housing, the housing upon one side of the diaphragm being open to atmospheric pressure and upon its other side being connected to the wiper-operating line, an electromagnet, an electrical circuit adapted to be connected to a source of current for energizing said electromagnet, an armature associated with the diaphragm and located within the influence of the electromagnet, check valves so constructed and arranged as to allow one-way flow of air from the wiper to the housing and from the housing to the intake manifold, an interrupter operated from said circuit for automatically making and breaking said circuit, said interrupter comprising a switch member, an armature associated with said switch member adapted to be attracted by the electromagnet for moving said switch member to circuit-opening position when the electromagnet is energized and resilient means for moving said switch members to circuit-closing position when said electromagnet is de-energized, and a spring-supported switch plate mounted upon one face of said diaphragm for opening and closing said circuit when the diaphragm is moved to different positions in response to differential air pressures upon opposite sides of the diaphragm.

4. A booster for windshield wipers of the type adapted to be operated by the suction produced in a line connected to the intake manifold of an engine, said booster comprising a housing, a flexible diaphragm within said housing, the housing upon one side of the diaphragm being open to atmospheric pressure and upon its other side being connected to a coupling in series with the wiper-operating line, an electromagnet, an electrical circuit adapted to be connected with a source of current for energizing said electromagnet, a contact plate interposed in said circuit and overlying one pole of the electromagnet, said contact plate maintaining said circuit open, an armature associated with the diaphragm and located adjacent said contact plate, a switch plate yieldingly supported by the diaphragm in line with the contact plate, means yieldingly urging the diaphragm in a direction so as to effect engagement of the switch plate with said contact plate to close the circuit, a pivoted switch arm located adjacent the other pole of said electromagnet, a contact button interposed in said circuit, a spring urging said switch arm in a direction so as to engage said contact button and close the circuit, and an armature upon said switch arm adapted to be attracted by the electromagnet when the electromagnet is energized to break engagement with said contact button and open said circuit, said coupling including a one-way check valve for maintaining communication between the manifold line and housing when the air pressure in the housing is less than the pressure in the manifold line, and a second one-way check valve for maintaining communication between the wiper line and the housing when the pressure in the housing is less than the pressure in the wiper line, the construction and arrangement being such that when the suction in the manifold line attains a value necessary to effect satisfactory operation of the wiper the diaphragm is displaced so as to move the switch plate out of engagement with the contact plate and break the circuit and when the suction in the manifold line falls below such value to allow said yielding means to displace said diaphragm to a position in which the switch plate engages said contact plate.

5. In a booster for devices adapted to be operated by the suction produced in a line connected to the intake manifold of an engine, the combination of a housing, a flexible diaphragm located within said housing and exposed on one side to atmospheric pressure and on its other side to the pressure within said connecting line, an electromagnet, an armature secured to the diaphragm adapted to be attracted by the electromagnet when the electromagnet is energized, a field circuit for the electromagnet connected with a source of direct current, an interrupter in said circuit for automatically making and breaking the circuit, a contact plate interposed in said circuit and normally maintaining said circuit open, a switch plate yieldingly supported on one face of said diaphragm, and a spring-pressed member engaging the other face of said diaphragm and urging said diaphragm into a position such that the switch plate engages and bridges the contact plate to close the field circuit.

6. In a booster for devices adapted to be operated by the suction produced in a line connected to the intake manifold of an engine, the combination of a housing, a flexible diaphragm located within said housing and exposed on one side to atmospheric pressure and on its other side to the pressure within said connecting line, an electromagnet, an armature secured to said diaphragm adapted to be attracted by the electromagnet when the electromagnet is energized, a field circuit for the electromagnet connected with a source of direct current, an interrupter in said circuit for automatically making and breaking the circuit, a contact plate interposed in said circuit and normally maintaining said circuit open, a switch plate yieldingly supported on one face of said diaphragm, and a spring-pressed member engaging the other face of said diaphragm, said diaphragm being so constructed and arranged to occupy a forward position in opposition to the spring-pressed member with the switch plate out of engagement with the contact plate, an intermediate position under the influence of the spring-pressed member with the switch plate in engagement with the contact plate, and a rearward position under the attraction of the electromagnet.

RALPH G. HAMILTON.